United States Patent Office 3,492,293
Patented Jan. 27, 1970

3,492,293
[3-KETO-5-ENYL STEROID]PALLADIUM
COMPLEXES
John H. Fried, Palo Alto, Calif., assignor to Syntex Corporation, Panama, Panama, a corporation of Panama
No Drawing. Filed Jan. 18, 1968, Ser. No. 698,702
Int. Cl. C07f 15/00; C07c 173/00, 169/34
U.S. Cl. 260—239.55                        18 Claims

ABSTRACT OF THE DISCLOSURE

Di-$\mu$-chlorodi[3-keto-5-enyl steroid]dipalladium derivatives prepared from corresponding 3-keto-6$\beta$-chloro-$\Delta^4$ steroids by treatment with palladium chloride, carbon monoxide, and a halide salt; and $\mu$-ligand-$\mu$-chloro[3-keto-5-enyl steroids]palladium derivatives prepared from the corresponding di-$\mu$-chlorodi[3-keto-5-enyl steriod]dipalladium by treatment with a ligand in a halo hydrocarbon solvent are anabolic agents, progestational agents, or anti-inflammatory agents.

---

The present invention is directed to novel [3-keto-5-enyl steroid]palladium complexes and preparations thereof.

More particularly, the present invention is directed to the compounds of the formulas:

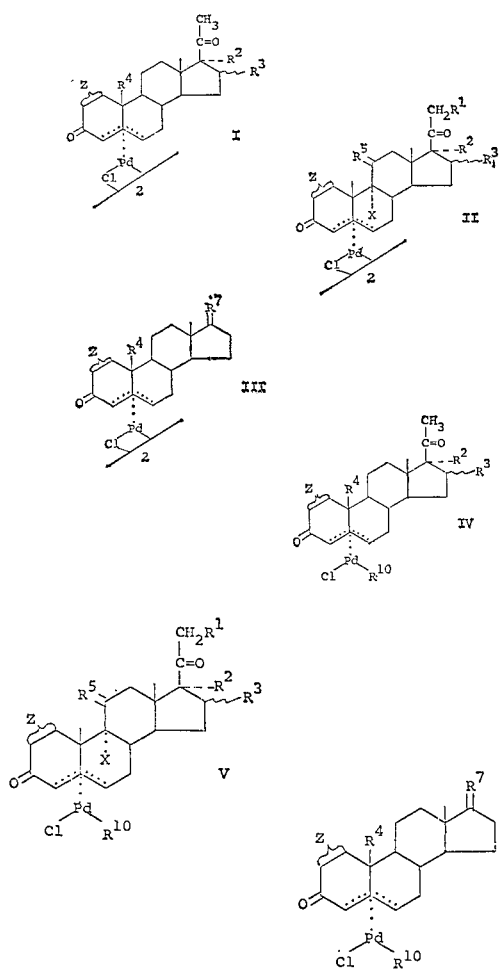

wherein
$R^1$ is hydrogen, fluoro, hydroxy, a conventional hydrolyzable ester;

$R^2$ is $\alpha$-hydrogen, $\alpha$-hydroxy, $\alpha$-methyl, or an $\alpha$-conventional hydrolyzable ester;
$R^3$ is hydrogen, hydroxy, methyl, or a conventional hydrolyzable ester or
$R^2$ and $R^3$ taken together are 16$\alpha$,17$\alpha$-isopropylidenedioxy;
$R^4$ is hydrogen or methyl;
$R^5$ is O= or the group

$R^6$ is hydroxy or chloro;
$R^7$ is O= or the group

$R^8$ is hydroxy, a conventional hydrolyzable ester, tetrahydrofuran-2'-yloxy, or tetrahydropyran-2'-yloxy;
$R^9$ is hydrogen, alkyl, alkenyl, chlorovinyl, alkynyl, or 3',3',3'-trifluoroprop-1'-ynyl;
$R^{10}$ is one of the group $N(R^{11})_3$,

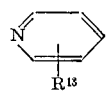

$P(R^{12})_3$, or $P(OR^{11})_3$;
$R^{11}$ is alkyl;
$R^{12}$ is alkyl or aryl;
$R^{13}$ is hydrogen, alkyl, fluoro, chloro, hydroxy, or alkoxy;
X is hydrogen, fluoro, or chloro; provided that when one of $R^6$ and X is chloro, the other is chloro; and
Z is a carbon-carbon single bond or a carbon-carbon double bond; provided that Z is a carbon-carbon single bond when $R^4$ is hydrogen.

The palladium complexes of Formulas I, II, and III are shown as bonded via $\pi$-allyl groups which can be alternatively shown as follows:

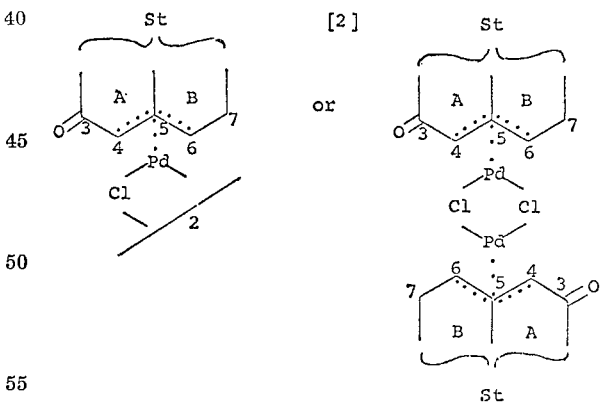

wherein A and B designate portions of the A and B rings of a steroid molecule; St designates the remainder of the steroid molecule (including the remaining portions of the A and B rings); and the numbers indicate the carbon atom positions on the steroid molecule.

The palladium atom is bonded to the steroid molecule via the $\pi$-electron cloud in the vicinity of positions 4, 5, and 6 by means of a $\pi$-allyl system. The dotted lines in Formulas I–VI, [1] and [2] designate the $\pi$-allyl system and are in accord with the art recognized method of designation; see, for example, Kasahara et al., Bulletin of the Chemical Society of Japan 40, 351–355 (1967).

The dashed lines (- - -) at positions 9 and 17 denote that the X and $R^2$ groups, respectively, are in the $\alpha$ configuration with respect to those positions. The serpentine line (∼) at position 16 denotes that the $R^3$ group is either in the $\alpha$ or $\beta$ configuration.

By the term "alkyl" is meant straight or branched chain hydrocarbons of one to six carbon atoms. Typical alkyl groups include methyl, ethyl, isopropyl, butyl, and the like.

By the term "alkenyl" is meant straight or branched hydrocarbons of two to six carbon atoms with one or two olefinic bonds, including vinyl, prop-1-enyl, but-2-enyl, but-1,3-dienyl, and the like.

By the term "lower alkynyl" is meant acetylenic aliphatic hydrocarbons that are straight or branched chain with one or two acetylenic bonds of from two to six carbon atoms. When modified by the term "halo," such halo lower alkynyls are substituted with one to three fluoro or chloro atoms. Typical lower alkynyls and halo lower alkynyls include ethynyl, propynyl, but-1-ynyl, hex-1,3-diynyl, 1-chloroethynyl, 3,3,3-trifluoropropynyl, and the like.

The term "conventional hydrolyzable ester" as used herein denotes those hydrolyzable ester groups conventionally employed in the steroid art, preferably those derived from hydrocarbon carboxylic acids. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure and preferably contain from one to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclophenylpropionate, adamantoate, glycolate, methoxyacetate, hemisuccinate, hemiadipate, hemi-$\beta,\beta$-dimethylglutarate, acetoxyacetate, 2-chloro-4-nitrobenzoate, aminoacetate, diethylaminoacetate, piperidinoacetate, $\beta$-chloropropionate, trichloroacetate, $\beta$-chlorobutyrate, and the like.

The present compounds of Formulas I–VI exhibit enhanced hormonal activity in comparison with the hormonal activity of the starting materials which are well known to the art.

The compounds of Formulas I and IV exhibit progrestational activity. Consequently, these compounds are effective in the treatment of threatened abortion due to progesterone production deficiency, threatened premature labor due to progesterone production deficiency, dysmenorrhea, endometriosis, sexual precocity, functional uterine bleeding, and the like. These novel compounds are administered via usual pharmaceutically acceptable routes, such as orally, parenterally, and the like, at dosages of 0.01 mg. to 1 mg. per kilogram of body weight of the chordate animal subject.

The present novel compounds of Formulas II and V exhibit anti-inflammatory and glucocorticoid activity. The compounds are accordingly useful in the treatment of skin diseases, such as dermatoses; musculoskeletal and collagen diseases, such as rheumatoid arthritis; allergic diseases, such as asthma; and the like. These novel compounds are administered via the usual pharmaceutically acceptable routes, such as orally, parenterally, at dosages of from about 0.001 mg. to about 2.0 mg. per kilogram of body weight of the chordate animal subject, or topically at dosage concentrations of from about 0.01% to about 1.0%.

The present novel compounds of Formulas III and VI, where $R^4$ is hydrogen, are anti-fertility agents and are accordingly useful in contraception and are lactation inhibitors accordingly useful in mammary gland malfunctions. The present novel compounds of Formulas III and VI, where $R^4$ is methyl, exhibit androgenic and anabolic activity. These compounds are useful in the treatment of primary or secondary hypogonadism, cryptorchis, certain forms of male climacteric, and like conditions. These novel compounds are administered in the usual pharmaceutically acceptable routes, such as subcutaneously, parenterally, and the like, at dosages of from about 0.01 mg. to about 1.0 mg. per kilogram of the body weight of the chordate animal subject.

Orally, the present compounds are administered as solids in the form of pills, tablets, powders (free or encapsulated), and the like or as liquids in the form of solutions (aqueous or non-aqueous), suspensions (aqueous and non-aqueous), syrups, and the like.

Parenterally, the present compounds are generally administered as liquids in the form of aqueous suspensions or as non-aqueous suspensions or solutions or as solids (in the form of pellets, powders, tablets, and the like).

Topically, the present compounds are administered in the usual pharmaceutically accepted means, such as powders, creams, ointments, solutions, suspensions, aerosoles, foams, and the like, containing about 0.001% to about 1% of the compound with the remainder being a pharmaceutically accepted inert vehicle or combinations of such vehicles.

Orally, parenterally, and topically, the present novel compounds exhibiting anti-inflammatory activity (the compounds of Formulas II and V) can be administered alone or in combination with one or more pharmaceutically accepted therapeutic agents, such as antibiotics.

The dosage of the present novel compounds that is administered and the route of administration will normally be selected by the physician or veterinarian administering the compound and the choice will be governed by the type of compound (estrogenic, androgenic, and the like), the specific activity of the compound, the physical condition of the subject (human or animal), the condition to be treated, and the like.

The novel compounds of Formulas I, II, and III are not only useful as medicinal agents, but they also are intermediates in the preparation of the novel compounds of Formulas IV, V, and VI.

The novel di-$\mu$-chlorodi[3-keto-5-enyl steroids]dipalladium compounds of Formulas I, II, and III are prepared from the corresponding 3-keto-6$\beta$-chloro-$\Delta^4$-ene steroids of the following formulas:

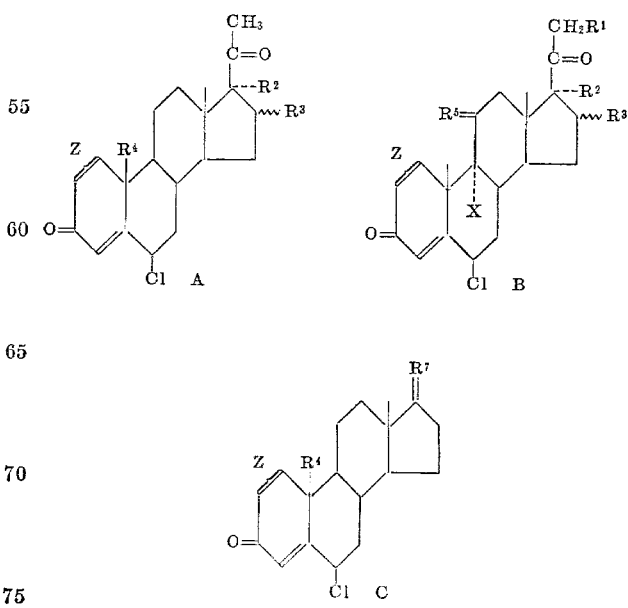

wherein $R^1$, $R^2$, $R^3$, $R^4$, $R^5$, $R^7$, X, and Z are as defined above.

Accordingly, the novel compounds of Formula I are prepared from the 3-keto-6β-chloro-$\Delta^4$-ene steroids of the pregnane series of Formula A. The novel compounds of Formula II are prepared from the 3-keto-6β-chloro-$\Delta^4$-ene steroids of the corticoid series of Formula B. The novel compounds of Formula III are prepared from the 3-keto-6β-chloro-$\Delta^4$-ene steroids of Formula C.

The compounds of Formulas I, II, and III are prepared by treating the starting steroids of Formulas A, B, and C, respectively, with palladium chloride and carbon monoxide in the presence of water and an alkali metal halide or alkaline metal earth halide. Conveniently, the process is conducted in a water-miscible inert organic solvent. The process is conducted at a temperature in the range of about 0° C. to about 100° C., conveniently at room temperature.

At least a molar equivalent of palladium chloride and carbon monoxide are employed and one-half molar equivalents of an alkali metal halide or alkaline earth metal halide are employed per molar equivalent of the starting steroids of the Formulas A–C. Preferably three or more molar equivalents of carbon monoxide are employed.

Sufficient water is used to dissolve the alkali metal halide or alkaline earth metal halide.

Typical water-miscible inert organic solvents that can be employed in the present process include lower alkanols, such as methanol or ethanol; ethers, such as dioxane, tetrahydrofuran, 1,2-dimethoxyethane, and the like.

The novel compound products are isolated by conventional means. For example, the reaction mixture is filtered, extracted with a water-immiscible inert organic solvent, such as methylene chloride, diethylether, benzene, and the like. The combined extracts are washed, dried, and evaporated to furnish the novel products. The product can be further purified by conventional techniques, such as crystallization, chromatography, and the like.

The novel μ-ligand-μ-chloro[3-keto-5-enyl steroid]palladium compounds of Formulas IV, V, and VI are prepared from the corresponding novel compounds of Formulas I, II, and III, respectively, according to the following reaction sequence, using partial formulas:

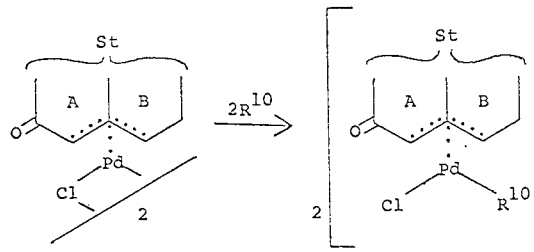

wherein A and B designate the A and B rings of a steroid molecule, respectively; St represents the remainder of the steroid molecule; and $R^{10}$, a ligand, is as defined above.

This new process comprises allowing a compound of one of the Formulas I, II, and III to react with two molar equivalents of an $R^{10}$ ligand in a halo hydrocarbon solvent. The halo hydrocarbons of choice are dichloromethane and chloroform.

The process is conducted at temperatures of at least 0° C. and preferably at the reflux temperature of the process reaction mixture.

The $R^{10}$ ligands are highly polar trisubstituted phosphorus or nitrogen compounds. Typical $R^{10}$ ligands include trialkyl amines of the formula $N(R^{11})_3$, pyridine derivatives of the formula

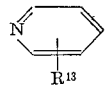

trialkyl phosphites of the formula $P(OR^{11})_3$, and trialkyl or triphenyl phosphines of the formula $P(R^{12})_3$, wherein $R^{11}$, $R^{12}$, and $R^{13}$ are as defined above.

The novel products of the above new process can be readily isolated by evaporating the process reaction mixture. The products can be further purified by conventional techniques, such as recrystallization, chromatography, and the like.

The starting steroids of Formulas A–C are known in the art and, moreover, they can be made by conventional means. For example, the starting steroids of Formula A can be prepared from 17α-hydroxypregn-4-ene-3,20-dione or 17α-hydroxy-19-norpregn-4-ene-3,20-dione. The starting steroids of Formula B can be prepared from 17α,21-dihydroxypregn-4-ene-3,20-dione or 11β,17α,21-trihydroxypregn-4-ene-3,20-dione and the starting steroids of Formula C can be prepared from estr-4-ene-3,20-dione or androst-4-ene-3,20-dione.

The $\Delta^1$ unsaturation can be introduced by refluxing $\Delta^4$ steroids in dioxane in the presence of 5,6-dichloro-2,3-dicyano-1,4-benzoquinone.

The 6-chloro group is introduced by treating 3-ethoxy-$\Delta^{3,5}$ steroids with N-chlorosuccinimide. The 3-ethoxy-$\Delta^{3,5}$ steroids are produced by treating the corresponding 3-keto-$\Delta^4$ steroids with ethyl orthoformate in the presence of p-toluene sulfonic acid.

The 9α-fluoro groups are introduced by treating 9β,11β-oxido steroids with hydrogen fluoride in an inert, non-aqueous, preferably anhydrous, solvent or mixture of such solvents. The 9β,11β-oxido steroids are prepared from the corresponding $\Delta^{9(11)}$ steroid (which is prepared by treating the corresponding 11β-hydroxy steroid with methane sulfonyl chloride in dimethylformamide in the presence of pyridine) by treating the latter with N-bromoacetamide and perchloric acid in dioxane or tetrahydrofuran and then refluxing the resulting 9-bromo-11-hydroxy steroids with potassium acetate in acetone. The 9α,11β-dichloro configuration is introduced by treating the $\Delta^{9(11)}$ steroids with chlorine gas in chloroform.

The 16-methyl group is introduced by treating 17α-hydroxy steroids with semicarbazide hydrochloride in the presence of an equivalent amount of base, then refluxing the resulting 3,20-bis-semicarbazones in an acetic acid/acetic anhydride mixture followed by treatment with pyruvic acid to afford the corresponding $\Delta^{16}$ steroids. Treatment of the latter with methyl magnesium bromide in the presence of cuprous chloride affords 16-methyl steroids. The 16α,17α-dihydroxy configuration is introduced by treating $\Delta^{16}$ steroids with an aqueous potassium permanganate solution. The 16-methyl-17α-hydroxy configuration is introduced by treating $\Delta^{16}$ steroids with diazomethane and then heating the resulting product to afford the corresponding $\Delta^{16}$-16-methyl steroids. The latter is treated with aqueous basic solution of hydrogen peroxide to furnish the corresponding 16α,17α-oxido-16β-methyl steroids, which afford the corresponding 16,17-bromohydrin-16-methyl steroids when treated with hydrogen bromide in glacial acetic acid. The latter are reduced with hydrogen employing a palladium catalyst to obtain the 16-methyl-17α-hydroxy steroid. The 16α,17α-dihydroxy-16β-methyl configuration is introduced by treating $\Delta^{16}$-16-methyl steroids, prepared as described above, with an aqueous potassium permanganate solution.

The 17α-hydroxy groups are esterified by employing conventional techniques, such as by treating the hydroxy derivatives with an acid anhydride in the presence of an acid catalyst, such as p-toluene sulfonic acid.

The 16α,17α - acetals and ketals are introduced by treating the 16α,17α-dihydroxy steroids with the appropriate ketone or aldehyde in the presence of perchloric acid.

The 17β-hydroxy-17α-alkyl moieties are introduced onto 17-keto steroids by refluxing the latter with an equal molar amount of alkyl magnesium bromide.

The 17β-hydroxy-17α-alkynyl moieties are introduced onto 17-keto steroids by treating the latter with an equivalent amount of a lithium alk-1-ynylate in tetrahydrofuran and dimethylsulfoxide.

The 17β-hydroxy-17α-alkenyl steroids are prepared by hydrogenating the corresponding 17β - hydroxy-17α-alkynyl steroids with a molar equivalent of hydrogen in the presence of Lindlar catalyst.

The 17β-hydroxy-17α-haloalkynyl moieties are introduced by the processes described in the art, for example, see U.S. Patents 3,046,273 and 3,067,214. The 17β-hydroxy-17α-haloalkenyl steroids can be prepared from the corresponding 17β-hydroxy-17α-haloalkynyl steroids by selectively reducing the latter.

The hydroxy groups (both secondary and tertiary) are esterified and etherified by conventional methods known to the art, for example, the 21-hydroxy groups can be etherified by treatment with dialkylsulfate in acetone, ethanol, or the like; or by treatment with an alkanol in the presence of boron trifluoride; or by treatment with dehydropyran in the presence of an acid catalyst. The 17β-hydroxy groups can be esterified by treatment with an acid anhydride in pyridine.

The following examples are intended to further illustrate and typify the nature of this invention; they are not intended as a limitation on the scope of this invention.

EXAMPLE 1

To a mixture of 720 mg. of 6β-chloro-17α-acetoxy-pregn-4-ene-3,20-dione and 50 ml. of methanol is added a mixture of 72 mg. of palladium chloride, 48 mg. of sodium chloride, and 36 g. of water. The mixture is stirred and saturated with carbon monoxide. The mixture is stirred for an additional one-half hour while continuing to bubble carbon monoxide into the reaction mixture. The reaction mixture is diluted with 300 ml. of water and extracted with chloroform. The extracts are combined, washed with water, dried over magnesium sulfate, and evaporated. The residue is chromatographed on silica eluting with methanol to give di-μ-chloro-di[3,20-dioxo-17α-acetoxypregn-5-enyl]dipalladium.

Similarly, di - μ-chlorodi[3,20-dioxo-16α-methyl-17α-acetoxy - 19 - norpregn-5-enyl]dipalladium, di-μ-chlorodi[3,20 - dioxo - 16α-methyl-17α-acetoxypregn-5-enyl]dipalladium, di - μ - chlorodi[3,20-dioxo-17α-acetoxy-19-norpregn - 5 - enyl]dipalladium, di-μ-chlorodi-[3,20-dioxo - 17α - valeryloxypregn - 5-enyl]dipalladium, di-μ-chlorodi[3,20 - dioxo - 19-norpregn-5-enyl]dipalladium, di - μ - chlorodi[3,20 - dioxo - 16α,17α - dihydroxypregna-1,5-dienyl]dipallidum are prepared from the corresponding - 3-keto-6β-chloro-Δ⁴-ene steroids.

EXAMPLE 2

To a mixture of 750 mg. of 6β-chloro-11β,17α,21-trihydroxy - 16α - methylpregn-4-ene-3,20-dione and 50 ml. of methanol is added a mixture of 72 mg. of palladium chloride, 48 mg. of sodium chloride, and 36 g. of water. The mixture is stirred and saturated with carbon monoxide. The mixture is stirred for an additional one-half hour while continuing to bubble carbon monoxide into the reaction mixture. The reaction mixture is diluted with 300 ml. of water and extracted with chloroform. The extracts are combined, washed with water, dried over magnesium sulfate, and evaporated. The residue is chromatagraphed on silica eluting with methanol to give di-μ-chlorodi[3,20-dioxo - 11β,17α,21 - trihydroxy-16α-methylpregn-5-enyl] dipalladium.

Similarly, di-μ-chlorodi[3,20-dioxo - 11β,17α,21 - trihydroxy - 16α - methylpregna - 1,5-dienyl]dipalladium, di-μ-chlorodi[3,20-dioxo - 9α - fluoro - 11β,17α,21 - trihydroxy-16α-methylpregn-5-enyl]dipalladium, di-μ - chlorodi[3,20-dioxo-9α-fluoro-11β,17α,21-trihydroxy - 16α - methylpregna - 1,5 - dienyl]dipalladium, di-μ-chlorodi[3,20-dioxo-9α-fluoro-11β,21-dihydroxypregna-1,5-dienyl]dipalladium, di-μ-chlorodi[3,20-dioxo-11β,21-dihydroxy - 16α,17α - isopropylidenedioxypregn-5-enyl]dipalladium, di-μ-chlorodi[3,20-dioxo-11β,21 - dihydroxy - 16α,17α-isopropylidenedioxypregna-1,5 - dienyl]dipalladium, di-μ-chlorodi[3,20-dioxo - 9α - fluoro - 11β,21-dihydroxy-16α,17α-isopropylidenedioxypregn-5-enyl]dipalladium, di-μ-chlorodi[3,20-dioxo-9α-fluoro-11β,21-dihydroxy-16α,17α - isopropylidenedioxypregna - 1,5 - dienyl]dipalladium, di - μ - chlorodi [3,11,20-trioxo - 21-acetoxy-16α,17α-isopropylidenedioxypregn - 5 - enyl]dipalladium, di - μ - chlorodi[3,20 - dioxo-9α,11β-dichloro-17α,21-dihydroxypregn - 5 - enyl]dipalladium, di-μ-chlorodi[3,20-dioxo-9α,11β-dichloro-17α,21-diacetoxypregna - 1,5 - dienyl]dipalladium, di-μ-chlorodi [3,20 - dioxo - 9α,11β-dichloro - 21 - caproxy-16α,17α-isopropylenedioxypregna - 1,5-dienyl]dipalladium, and di-μ - chlorodi[3,20 - dioxo - 11β,21 - dihydroxy-16β-methylpregn - 5 - enyl] - dipalladium are prepared from the corresponding 3-keto-6β-chloro-Δ⁴ steroids.

EXAMPLE 3

To a mixture of 560 mg. of 6β-chloro-17β-hydroxyestr-4-en-3-one and 50 mg. of methanol is added a mixture of 72 mg. of palladium chloride, 48 mg. of sodium chloride, and 36 g. of water. The mixture is stirred for an additional two and one-half hours while continuing to bubble carbon monoxide into the reaction mixture. The reaction mixture is diluted with 300 ml. of water and extracted with chloroform. The extracts are combined, washed with water, dried over magnesium sulfate, and evaporated. The residue is chromatographed on silica eluting with methanol to give di-μ-chlorodi[3-oxo-17β-hydroxyestr-5-enyl]dipalladium.

Similarly, di-μ-chlorodi[3-oxo-17α-ethynyl-17β-hydroxyestr - 5 - enyl]dipalladium, di-μ-chlorodi[3,17 - dioxandrost-5-enyl]dipalladium, di-μ-chlorodi[3-oxo-17α-vinyl-17β-hydroxyandrost-5-enyl]dipalladium, di-μ-chlorodi[3-oxo-17β-acetoxy-17α - ethylandrosta - 1,5 - dienyl]dipalladium, di-μ-chlorodi[3,17-dioxoestr-5-enyl]dipalladium, di-μ-chlorodi[3-oxo-17α-prop-1-ynyl-17β-caproxyandrost - 5-enyl]dipalladium, and di-μ-chlorodi[3-oxo-17β-decanoyloxyestr-5-enyl]dipalladium are prepared from the corresponding 3-keto-6β-chloro-Δ⁴-ene steroids.

EXAMPLE 4

To a mixture of 1.14 g. of di-μ-chlorodi[3,20-dioxo-17α-acetoxypregn-5-enyl]dipalladium and 50 ml. of chloroform are added 360 mg. of pyridine. The mixture is allowed to stand for four hours and then evaporated to yield μ-pyridino-μ-chloro[3,20-dioxo - 17α - acetoxypregn-5-enyl]palladium.

Similarly, μ-triethylamino-μ-chloro[3,20-dioxo-17α-acetoxypregn - 5 - enyl]palladium, μ-triphenylphosphino-μ-chloro[3,20 - dioxo - 17α - acetoxypregn - 5 - enyl]palladium, and μ - triethylphosphito - μ-chloro[3,20-dioxo-17α-acetoxypregn-5-enyl]palladium are prepared by means of the above described process by employing 405 mg. of triethylamine, 10.5 mg. of triphenyl phosphine or 500 mg. of triethyl phosphite in place of pyridine in the above process.

The novel di-μ-chlorodi[3-keto-5-enyl steroid]dipalladium compounds prepared via the procedures described in Examples 1, 2, and 3 can be used as starting materials in the above process. Accordingly, μ-pyridino-μ-chloro[3,20-dioxo-11β,17α,21-trihydroxy - 16α - methylpregn-5-enyl]palladium and μ-pyridino-μ-chloro[3-oxo-17β-hydroxyestr-5-enyl]palladium are prepared from di-μ-chlorodi[3,20-dioxo-11β,17α,21-trihydroxy-16α - methylpregn-5-enyl]dipalladium and di-μ-chlorodi[3-oxo-17β-hydroxyestr-5-enyl]dipalladium, respectively, by means of the above process.

What is claimed is:
1. The compounds of the formulas:

[Formula I structure]

[Formula II structure]

[Formula III structure]

wherein
R¹ is hydrogen, fluoro, hydroxy, a conventional hydrolyzable ester;
R² is α-hydrogen, α-hydroxy, α-methyl, or an α-conventional hydrolyzable ester;
R³ is hydrogen, hydroxy, methyl, or a conventional hydrolyzable ester; or
R² and R³ taken together are 16α,17α-isopropylidenedioxy;
R⁴ is hydrogen or methyl;
R⁵ is O= or the group $$\overset{H}{\underset{R^6}{\vdots}}$$

R⁶ is hydroxy or chloro;
R⁷ is O= or the group $$\overset{R^8}{\underset{R^9}{\vdots}}$$

R⁸ is hydroxy, a conventional hydrolyzable ester, tetrahydrofuran-2′-yloxy, or tetrahydropyran-2′-yloxy;
R⁹ is hydrogen, alkyl, alkenyl, chlorovinyl, alkynyl, or 3′,3′,3′-trifluoroprop-1′-ynyl;
X is hydrogen, fluoro, or chloro; provided that when one of R⁶ and X is chloro, the other is chloro; and
Z is a carbon-carbon single bond or a carbon-carbon double bond; provided Z is a carbon-carbon single bond when R⁴ is hydrogen.

2. The compounds according to claim 1 wherein R¹ is hydroxy, fluoro, acetoxy, valeryloxy, or caproxy;
R² is α-hydrogen, α-hydroxy, α-acetoxy, or α-valeryloxy;
R³ is hydrogen or methyl; or
R² and R³ taken together are 16α,17α-isopropylidenedioxy;
R⁴ is hydrogen or methyl;
R⁵ is the group $$\overset{H}{\underset{R^6}{\vdots}}$$

R⁶ is hydroxy or chloro;
R⁷ is the group $$\overset{R^8}{\underset{R^9}{\vdots}}$$

R⁸ is hydroxy or a conventional hydrolyzable ester;

R⁹ is hydrogen, methyl, ethyl, vinyl, ethynyl, or prop-1-ynyl;
x is hydrogen, fluoro, or chloro; provided that when one of R⁶ and X is chloro, the other is chloro; and
Z is a carbon-carbon single bond or a carbon-carbon double bond; provided Z is a carbon-carbon single bond when R⁴ is hydrogen.

3. A compound of Formula I according to claim 2, di-μ-chlorodi[3,20-dioxo-17α-acetoxy-19-norpregn-5-enyl]dipalladium.

4. A compound of Formula I according to claim 2, di-μ-chlorodi[3,20-dioxo-16α-methyl-17α-acetoxy-19-norpregn-5-enyl]dipalladium.

5. A compound of Formula I according to claim 2, di-μ-chlorodi[3,20-dioxo-16α-methyl-17α-acetoxypregn-5-enyl]dipalladium.

6. A compound of Formula I according to claim 2, di-μ-chlorodi[3,20-dioxo-17α-acetoxypregn-5-enyl]dipalladium.

7. A compound of Formula II according to claim 2, di-μ-chlorodi[3,20-dioxo-11β,17α,21-trihydroxy-16α-methyl-pregn-5-enyl]dipalladium.

8. A compound of Formula II according to claim 2, di-μ-chlorodi[3,20-dioxo-11β-17α,21-trihydroxy-16α-methyl-pregna-1,5-dienyl]dipalladium.

9. A compound of Formula II according to claim 2, di-μ-chlorodi[3,20-dioxo-9α-fluoro-11β,17α,21-trihydroxy-16α-methylpregn-5-enyl]dipalladium.

10. A compound of Formula II according to claim 2, di-μ-chlorodi[3,20-dioxo-9α-fluoro-11β,17α,21-trihydroxy-16α-methylpregna-1,5-dienyl]dipalladium.

11. A compound of Formula II according to claim 2, di-μ-chlorodi[3,20-dioxo-11β,21-dihydroxy-16α,17α-isopropylidenedioxypregn-5-enyl]dipalladium.

12. A compound of Formula II according to claim 2, di-μ-chlorodi[3,20-dioxo-11β,21-dihydroxy-16α,17α-isopropylidenedioxypregna-1,5-dienyl]dipalladium.

13. A compound of Formula II according to claim 2, di-μ-chlorodi[3,20-dioxo-9α-fluoro-11β,21-dihydroxy-16α,17α-isopropylidenedioxypregn-5-enyl]dipalladium.

14. A compound of Formula II according to claim 2, di-μ-chlorodi[3,20-dioxo-9α-fluoro-11β,21-dihydroxy-16α,17α-isopropylidenedioxypregna-1,5-dienyl]dipalladium.

15. A compoun of Formula III according to claim 2, di-μ-chlorodi[3-oxo-17β-hydroxyestr-5-enyl]dipalladium.

16. A compound of Formula III according to claim 2, di-μ-chlorodi[3-oxo-17β-hydroxy-17α-ethynylestr-5-diphenyl]dipalladium.

17. A compound of one of the formulas:

[Structural formulas]

wherein
- $R^1$ is hydrogen, fluoro, hydroxy, or a conventional hydrolyzable ester;
- $R^2$ is α-hydrogen, α-hydroxy, α-methyl, or an α-conventional hydrolyzable ester;
- $R^3$ is hydrogen, hydroxy, methyl, or a conventional hydrolyzable ester; or
- $R^2$ and $R^3$ taken together are 16α,17α-isopropylidenedioxy;
- $R^4$ is hydrogen or methyl;
- $R^5$ is O= or the group

- $R^6$ is hydroxy or chloro;
- $R^7$ is O= or the group

- $R^8$ is hydroxy, a conventional hydrolyzable ester, tetrahydrofuran-2'-yloxy or tetrahydropyran-2'-yloxy;
- $R^9$ is hydrogen, alkyl, alkenyl, chlorovinyl, alkynyl, or 3',3',3'-trifluoroprop-1'-ynyl;
- $R^{10}$ is one of the group $N(R^{11})_3$,

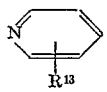

$P(R^{12})_3$, or $P(OR^{11})_3$;
- $R^{11}$ is alkyl;
- $R^{12}$ is alkyl or aryl;
- $R^{13}$ is hydrogen, alkyl, fluoro, chloro, hydroxy, or alkoxy;
- X is hydrogen, fluoro, or chloro; provided that when one of $R^6$ and X is chloro, the other is chloro; and
- Z is a carbon-carbon single bond or a carbon-carbon double bond; provided Z is a carbon-carbon single bond when $R^4$ is hydrogen.

18. A compound according to claim 17 wherein
- $R^1$ is hydroxy, fluoro, acetoxy, valeryloxy, or caproxy;
- $R^2$ is α-hydrogen, α-hydroxy, α-acetoxy, or α-valeryloxy;
- $R^3$ is hydrogen or methyl; or
- $R^2$ and $R^3$ taken together are 16α,17α-isopropylidenedioxy;
- $R^4$ is hydrogen or methyl;
- $R^5$ is the group

- $R^6$ is hydroxy or chloro;
- $R^7$ is the group

- $R^8$ is hydroxy or a conventional hydrolyzable ester;
- $R^9$ is hydrogen, methyl, ethyl, vinyl, ethynyl, or prop-1-ynyl;
- $R^{10}$ is trimethylamine, triethylamine, pyridine, triphenyl phosphine, trimethyl phosphite, or triethyl phosphite;
- X is hydrogen, fluoro, or chloro; provided that when one of $R^6$ and X is chloro, the other is chloro; and
- Z is a carbon-carbon single bond or a carbon-carbon double bond; provided Z is a carbon-carbon double bond when $R^4$ is hydrogen.

No references cited.

HENRY A. FRENCH, Primary Examiner

U.S. Cl. X.R
260—239.5, 397.3, 397.4, 397.45, 999